US012733016B2

(12) United States Patent
Liu et al.

(10) Patent No.: US 12,733,016 B2
(45) Date of Patent: Sep. 8, 2026

(54) SIDELINK COMMUNICATION USING A MULTIPLE-SLOT UNIT

(71) Applicant: QUALCOMM Incorporated, San Diego, CA (US)

(72) Inventors: Chih-Hao Liu, San Diego, CA (US); Xiaoxia Zhang, San Diego, CA (US); Jing Sun, San Diego, CA (US); Giovanni Chisci, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 343 days.

(21) Appl. No.: 18/508,564

(22) Filed: Nov. 14, 2023

(65) Prior Publication Data

US 2024/0260057 A1 Aug. 1, 2024

Related U.S. Application Data

(60) Provisional application No. 63/482,762, filed on Feb. 1, 2023.

(51) Int. Cl.
*H04L 27/26* (2006.01)
*H04W 72/0446* (2023.01)
*H04W 72/25* (2023.01)

(52) U.S. Cl.
CPC ....... *H04W 72/25* (2023.01); *H04L 27/26025* (2021.01); *H04W 72/0446* (2013.01)

(58) Field of Classification Search
CPC .............. H04W 72/25; H04W 72/0446; H04L 27/26025
See application file for complete search history.

(56) References Cited

U.S. PATENT DOCUMENTS

2022/0210768 A1* 6/2022 Zhou ..................... H04W 72/20
2023/0239899 A1* 7/2023 Ye ......................... H04L 1/1864
370/329

FOREIGN PATENT DOCUMENTS

CN 111800244 * 10/2020 ........... H04L 5/0055

OTHER PUBLICATIONS

3GPP TSG-RAN WG2 Meeting#99, R2-1707961 Title: Correction of congestion control for V2X sidelink communication in TS 36.321(Opt 2) (Year: 2017).*
3GPP TSG-RAN2 Meeting#101, R2-1803243 Title:Consideration of RRC connectionestablishment procedure (Year: 2018).*

* cited by examiner

*Primary Examiner* — Faruk Hamza
*Assistant Examiner* — Abusayeed M Haque
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of a multiple-slot unit structure that is to be used for sidelink communication, the multiple-slot unit structure having multiple contiguous slots that include, in sequence, a first time interval for automatic gain control, a second time interval for at least one of sidelink control communication or sidelink data communication, and a third time interval providing a time gap for transmission-reception switching. The UE may communicate, on a sidelink, in one or more multiple-slot units that are in accordance with the multiple-slot unit structure. Numerous other aspects are described.

25 Claims, 15 Drawing Sheets

800

810 Receive an indication of a multiple-slot unit structure that is to be used for sidelink communication, the multiple-slot unit structure having multiple contiguous slots that include, in sequence, a first time interval for AGC, a second time interval for at least one of sidelink control communication or sidelink data communication, and a third time interval providing a time gap for transmission-reception switching 820 Communicate, on a sidelink, in one or more multiple-slot units that are in accordance with the multiple-slot unit structure

SIDELINK COMMUNICATION USING A MULTIPLE-SLOT UNIT

CROSS-REFERENCE TO RELATED APPLICATION

This Patent Application claims priority to U.S. Provisional Patent Application No. 63/482,762, filed on Feb. 1, 2023, entitled "SIDELINK COMMUNICATION USING A MULTIPLE-SLOT UNIT," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for sidelink communication using a multiple-slot unit.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In sidelink communication, time resources at an end of a slot may be used as a time gap for a device to perform transmission-reception switching (Tx/Rx switching), which may include transmission-to-reception switching or reception-to-transmission switching. For higher numerologies, such as a numerology associated with a 120 kHz subcarrier spacing (SCS), a 480 kHz SCS, or a 960 kHz SCS, a time gap of multiple symbols (e.g., up to eight or more symbols) may be used for Tx/Rx switching. Thus, in some cases, more than half of a slot may be used as a time gap for Tx/Rx switching, resulting in an inefficient use of network resources.

Some techniques and apparatuses described herein provide for sidelink communication using a multiple-slot unit. The multiple-slot unit may include multiple contiguous slots and may contain a first time interval for performing automatic gain control (AGC), a second time interval for sidelink control communication and/or sidelink data communication, and a third time interval that provides a time gap for Tx/Rx switching. The third time interval for Tx/Rx switching may include one or multiple symbols for the time gap, which is useful in sidelink communication that uses higher numerologies. Inclusion of a multiple-symbol time gap on a per-slot basis may result in a large proportion of time resources being used as time gaps relative to a proportion of time resources used for sidelink control and data communication. Accordingly, the multiple-slot unit increases the proportion of time resources used for sidelink control and data communication and decreases the proportion of time resources used as time gaps, thereby facilitating efficient use of network resources.

Some aspects described herein relate to an apparatus for wireless communication at a user equipment (UE). The apparatus may include one or more memories and one or more processors coupled to the one or more memories. The one or more processors may be configured to receive an indication of a multiple-slot unit structure that is to be used for sidelink communication, the multiple-slot unit structure having multiple contiguous slots that include, in sequence, a first time interval for AGC, a second time interval for at least one of sidelink control communication or sidelink data communication, and a third time interval providing a time gap for transmission-reception switching. The one or more processors may be configured to communicate, on a sidelink, in one or more multiple-slot units that are in accordance with the multiple-slot unit structure.

Some aspects described herein relate to a method of wireless communication performed at an apparatus of a UE. The method may include receiving an indication of a multiple-slot unit structure that is to be used for sidelink communication, the multiple-slot unit structure having multiple contiguous slots that include, in sequence, a first time interval for AGC, a second time interval for at least one of sidelink control communication or sidelink data communication, and a third time interval providing a time gap for transmission-reception switching. The method may include communicating, on a sidelink, in one or more multiple-slot units that are in accordance with the multiple-slot unit structure.

Some aspects described herein relate to a non-transitory computer-readable medium that stores a set of instructions for wireless communication by a UE. The set of instructions, when executed by one or more processors of the UE, may cause the UE to receive an indication of a multiple-slot unit structure that is to be used for sidelink communication, the multiple-slot unit structure having multiple contiguous slots that include, in sequence, a first time interval for AGC, a second time interval for at least one of sidelink control communication or sidelink data communication, and a third time interval providing a time gap for transmission-reception switching. The set of instructions, when executed by one or more processors of the UE, may cause the UE to communicate, on a sidelink, in one or more multiple-slot units that are in accordance with the multiple-slot unit structure.

Some aspects described herein relate to an apparatus for wireless communication. The apparatus may include means for receiving an indication of a multiple-slot unit structure that is to be used for sidelink communication, the multiple-slot unit structure having multiple contiguous slots that include, in sequence, a first time interval for AGC, a second time interval for at least one of sidelink control communication or sidelink data communication, and a third time interval providing a time gap for transmission-reception switching. The apparatus may include means for communicating, on a sidelink, in one or more multiple-slot units that are in accordance with the multiple-slot unit structure.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
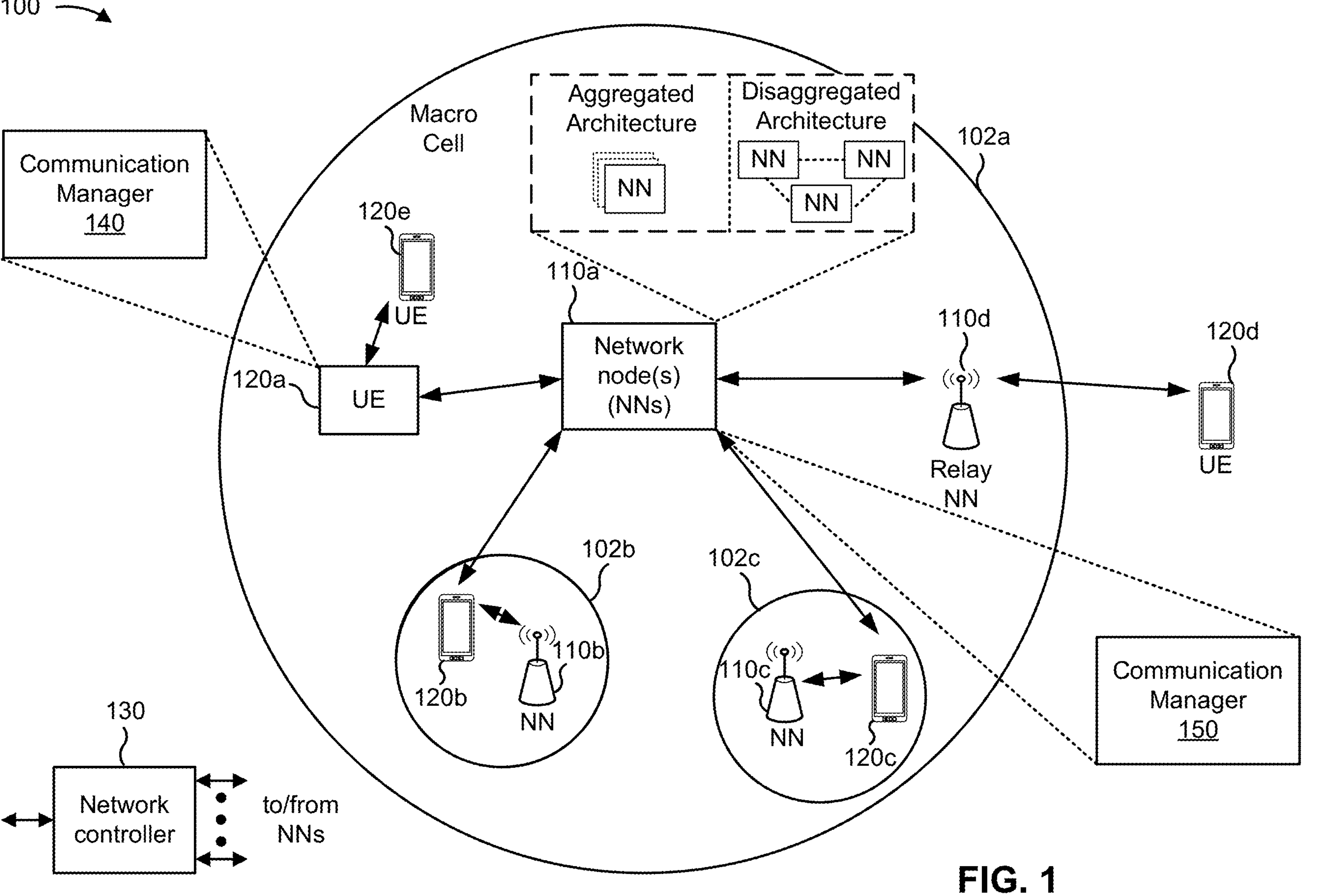
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2-1 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2-1, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2-1 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2-1 characteristics, and thus may effectively extend features of FR1 and/or FR2-1 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2-1, FR2-2, FR4, FR3, and/or FR5, or may be within the EHF band. It is contemplated that the frequencies included in these operating bands (e.g., FR1, FR2-1, FR2-2, FR3, FR4, and/or FR5) may be modified, and techniques described herein are applicable to those modified frequency ranges.

In some aspects, the UE 120 may include a communication manager 140. As described in more detail elsewhere herein, the communication manager 140 may receive an indication of a multiple-slot unit structure that is to be used for sidelink communication, the multiple-slot unit structure having multiple contiguous slots that include, in sequence, a first time interval for automatic gain control (AGC), a second time interval for at least one of sidelink control communication or sidelink data communication, and a third time interval providing a time gap for transmission-reception switching (Tx/Rx switching); and communicate, on a sidelink, in one or more multiple-slot units that are in accordance with the multiple-slot unit structure. Additionally, or alternatively, the communication manager 140 may perform one or more other operations described herein. In some aspects, the network node 110 may include a communication manager 150. The communication manager 150 may perform one or more operations described herein.

As indicated above, FIG. 1 is provided as an example. Other examples may differ from what is described with regard to FIG. 1.

Figure 2:
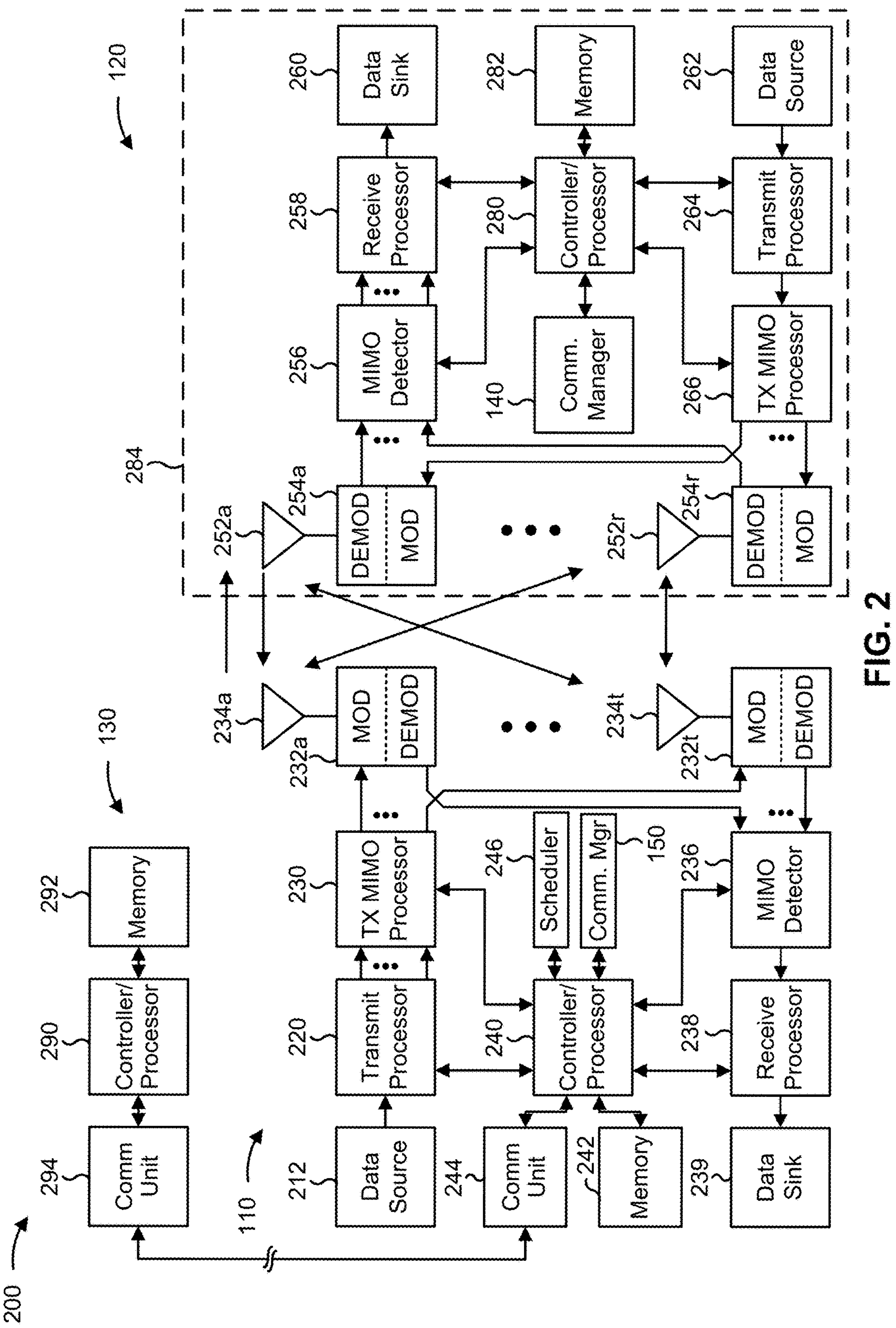
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DM. )) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

The controller/processor 240 of the network node 110, the controller/processor 280 of the UE 120, and/or any other component(s) of FIG. 2 may perform one or more techniques associated with sidelink communication using a multiple-slot unit, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving an indication of a multiple-slot unit structure that is to be used for sidelink communication, the multiple-slot unit structure having multiple contiguous slots that include, in sequence, a first time interval for AGC, a second time interval for at least one of sidelink control communication or sidelink data communication, and a third time interval providing a time gap for transmission-reception switching; and/or means for communicating, on a sidelink, in one or more multiple-slot units that are in accordance with the multiple-slot unit structure. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
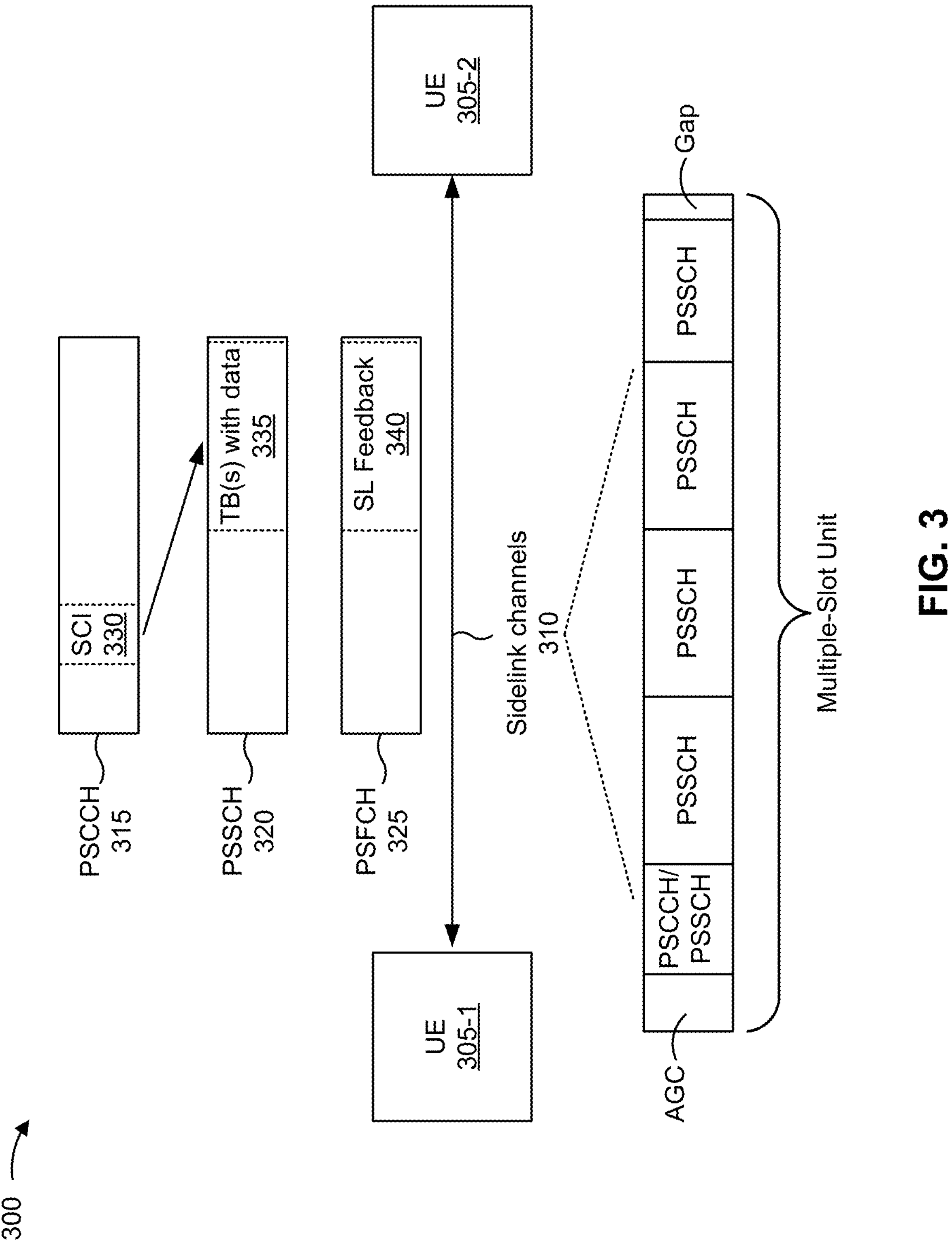
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a network node 110 via an access link or an access channel. The PSSCH 320 may be used to communicate data, similar to a physical downlink shared channel (PDSCH) and/or a physical uplink shared channel (PUSCH) used for cellular communications with a network node 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement (ACK) or negative acknowledgement (NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a HARQ process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a network node 110 (e.g., a base station, a CU, or a DU). For example, the UE 305 may receive a grant (e.g., in downlink control information (DCI) or in a radio resource control (RRC) message, such as for configured grants) from the network node 110 (e.g., directly or via one or more network nodes) for sidelink channel access and/or scheduling. In some aspects, a UE 305 may operate using a transmission mode (e.g., Mode 2) where resource selection and/or scheduling is performed by the UE 305 (e.g., rather than a network node 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy ratio (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As shown, in some aspects, the UEs 305 may perform sidelink transmissions using a time resource allocation of a multiple-slot unit (which can also be referred to as a "super slot"), as described herein. A multiple-slot unit may include multiple contiguous slots and may contain a contiguous time interval (which can also be referred to as a "time segment") for AGC, a contiguous time interval for Tx/Rx switching, and a contiguous time interval for PSCCH and/or PSSCH communication between the time interval for AGC and the time interval for Tx/Rx switching. A multiple-slot unit may contain transmissions originating from the same transmitter UE 305 and targeted for the same receiver UE 305.

As indicated above, FIG. 3 is provided as an example. Other examples may differ from what is described with respect to FIG. 3.

Different numerology approaches may be used for wireless communications, and different numerologies may correspond to different sub-carrier spacings (SCSs). When different numerologies are used, a duration of a symbol may be different. For example, a larger numerology may have a wider SCS and a shorter symbol duration, and a smaller numerology may have a narrower SCS and a longer symbol duration.

Various RF timelines may be employed, depending on a frequency range and/or an SCS used for communications. In FR2-1 with a 120 kHz SCS or in FR2-2 with a 120 kHz SCS (e.g., using a 60 GHz frequency), an on-to-off transient time may be 5 microseconds (μs), an off-to-on transient time may be 5 μs, a transmission-to-reception switching time may be 7.015 μs, a reception-to-transmission switching time may be 7.015 μs, a reception-to-reception beam switching time may be 200 nanoseconds (ns), and/or a transmission-to-transmission beam switching time may be 200 ns. In FR2-2 with a 480 kHz SCS or a 960 kHz SCS (e.g., using a 60 GHz frequency), an on-to-off transient time may be 5 μs (with an option for faster capability), an off-to-on transient time may be 5 μs (with an option for faster capability), a transmission-to-reception switching time may be 7.015 μs, a reception-to-transmission switching time may be 7.015 μs, a reception-to-reception beam switching time may be approximately 50 to 200 ns, and/or a transmission-to-transmission beam switching time may be approximately 50 to 200 ns.

As indicated by these RF timelines, a Tx/Rx switching time may be about 7 μs irrespective of SCS, whereas symbol durations for a 120 kHz SCS, a 480 kHz SCS, and a 960 kHz SCS may be 8.33 μs, 2.08 μs, and 1.04 μs, respectively. For higher numerologies, one or multiple Tx/Rx switching gap symbols may be used, such as 1 gap symbol, 4 gap symbols, or 8 gap symbols for a 120 kHz SCS, a 480 kHz SCS, and a 960 kHz SCS, respectively. A legacy sidelink slot structure may include one or more gap symbols for Tx/Rx switching in each slot, which may be inefficient for larger numerologies using multiple gap symbols. For example, in some cases, more than half of a slot may be used as a time gap for Tx/Rx switching.

In some examples, in contrast to the legacy sidelink slot structure, a sidelink slot structure may include one or more slots used for AGC for higher numerologies (e.g., associated with a 480 kHz SCS or a 960 kHz SCS). AGC symbols in an AGC slot may include a repetition of a PSCCH or a PSSCH, a randomly-generated quadrature phase shift keying (QPSK) modulation sequence and/or a randomly-generated quadrature amplitude modulation (QAM) sequence, and/or a repetition of a DMRS.

Some techniques and apparatuses described herein provide for sidelink communication using a multiple-slot unit. The multiple-slot unit may include multiple contiguous slots and may contain a first time interval for performing AGC, a second time interval for sidelink control communication and/or sidelink data communication, and a third time interval that provides a time gap for Tx/Rx switching. In some aspects, the multiple-slot unit may further include a fourth time interval for performing AGC in connection with a PSFCH, a fifth time interval for PSFCH communication, and a sixth time interval that provides another time gap for Tx/Rx switching.

The third time interval for Tx/Rx switching may include multiple symbols for the time gap. Such a multiple-symbol time gap is useful for sidelink communication that uses higher numerologies, such as a numerology associated with a 120 kHz SCS, a 480 kHz SCS, or a 960 kHz SCS. Inclusion of a multiple-symbol time gap on a per-slot basis may result in a large proportion of time resources being used as time gaps relative to a proportion of time resources used for sidelink control and data communication. Accordingly, the multiple-slot unit increases the proportion of time resources used for sidelink control and data communication and decreases the proportion of time resources used as time gaps, thereby facilitating efficient use of network resources.

As used herein, "slot" may refer a portion of a radio frame (or a subframe) within an LTE, 5G, or other wireless communication structure. In some aspects, a slot may include one or more symbols. Moreover, "symbol" may refer to an OFDM symbol or another similar symbol within a slot.

Figure 4:
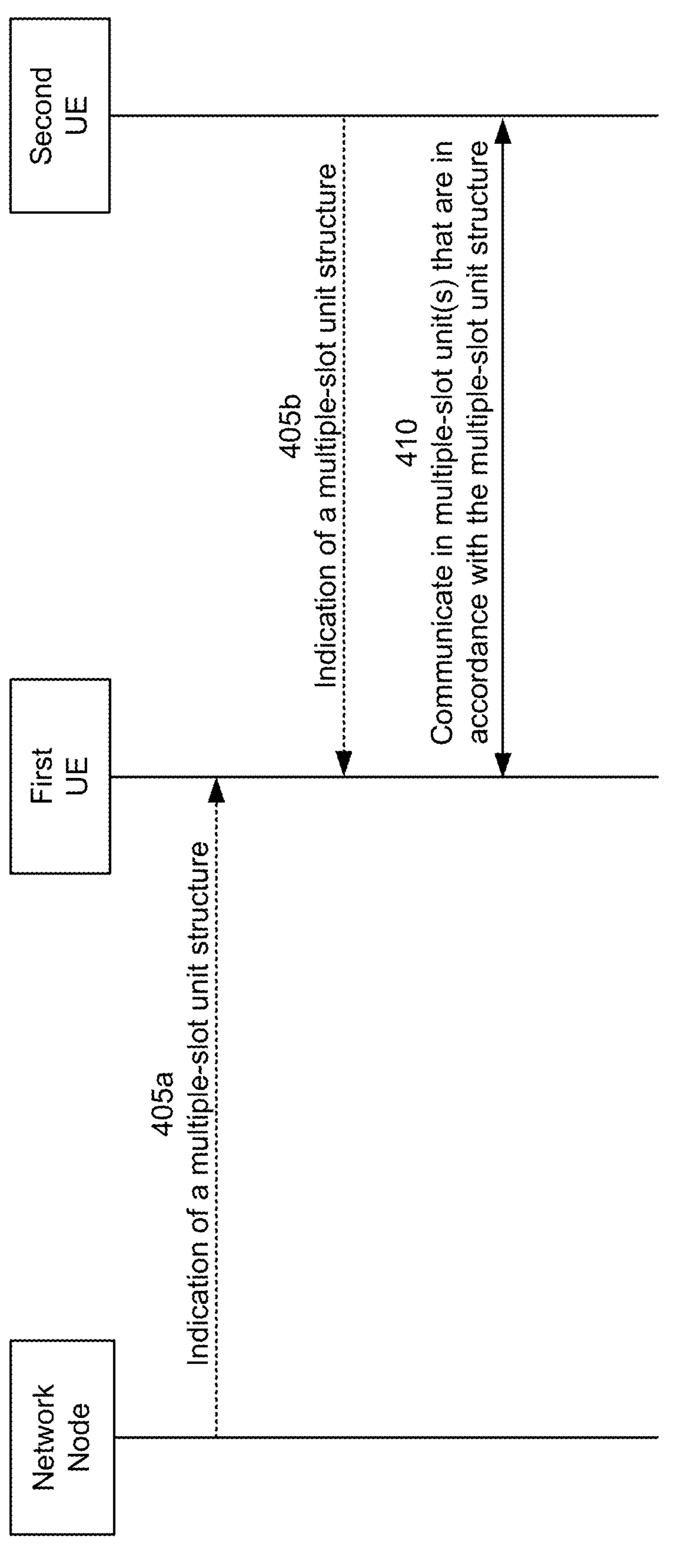
FIG. 4 is a diagram of an example associated with sidelink communication using a multiple-slot unit, in accordance with the present disclosure.

FIG. 4 is a diagram of an example 400 associated with sidelink communication using a multiple-slot unit, in accordance with the present disclosure. As shown in FIG. 4, a network node (e.g., network node 110, a CU, a DU, and/or an RU), a first UE (e.g., UE 120 or UE 305), and/or a second UE (e.g., UE 120 or UE 305) may communicate. In some aspects, the network node, the first UE, and/or the second UE may be part of a wireless network (e.g., wireless network 100). The first UE and the network node may have established a wireless connection (e.g., an access link connection) prior to operations shown in FIG. 4. Moreover, the first UE and the second UE may have established a wireless connection (e.g., a sidelink connection) prior to operations shown in FIG. 4.

As shown by reference number 405*a*, in some aspects, the network node may transmit, and the first UE may receive, an indication of a multiple-slot unit structure that is to be used for sidelink communication. Additionally, or alternatively, as shown by reference number 405*b*, the second UE may transmit, and the first UE may receive, an indication of a multiple-slot unit structure that is to be used for sidelink communication. For example, the first UE may receive the indication from the second UE in connection with sidelink UE assistance information and/or a sidelink negotiation (e.g., where the indication may be a request by the second UE or may be the second UE responding to a request of the first UE).

In some aspects, the indication may be in configuration information that indicates a numerology to be used for sidelink communication (e.g., a numerology associated with a 120 kHz SCS, a 480 kHz SCS, or a 960 kHz SCS), and the multiple-slot unit structure may be associated with the numerology (e.g., the multiple-slot unit structure may be used by default for a particular numerology). For example, the configuration information may implicitly indicate that the multiple-slot unit structure is to be used. Additionally, or alternatively, the indication may be in configuration information that indicates the multiple-slot unit structure. For example, the configuration information may explicitly indicate that the multiple-slot unit structure is to be used.

In some aspects, the first UE may receive the configuration information via one or more of RRC signaling, one or more medium access control (MAC) control elements (CEs), and/or DCI, among other examples. In some aspects, the first UE may receive the configuration information in sidelink UE assistance information and/or in connection with sidelink negotiation, as described herein. In some aspects, the configuration information may include an indication of one or more configuration parameters (e.g., already known to the first UE and/or previously indicated by the network node or another network device) for selection by the first UE, and/or explicit configuration information for the first UE to use to configure the first UE, among other examples. The first UE may configure itself based at least in part on the configuration information. In some aspects, the first UE may be configured to perform one or more operations described herein based at least in part on the configuration information. Other configurable parameters, described herein, may be configured for the first UE in a similar manner as described above.

As shown by reference number 410, the first UE and the second UE may communicate, on a sidelink, in one or more multiple-slot units that are in accordance with the multiple-slot unit structure. For example, the first UE may transmit, and the second UE may receive, sidelink communications in a time resource allocation of a multiple-slot unit. As another example, the first UE may receive, and the second UE may transmit, sidelink communications in a time resource allocation of a multiple-slot unit.

In some aspects, the multiple-slot unit structure may be used for sidelink communication associated with a higher numerology (e.g., a numerology associated with a 120 kHz SCS, a 480 kHz SCS, and/or a 960 kHz SCS) in FR2-2. The multiple-slot unit structure (e.g., without a PSFCH) may include multiple contiguous slots that include, in sequence, a first time interval for AGC (e.g., for transmission and reception of a signal used for AGC), a second time interval for sidelink control communication (e.g., PSCCH communication) and/or sidelink data communication (e.g., PSSCH communication), and a third time interval providing a time gap for Tx/Rx switching. For example, each multiple-slot unit may start with one or more symbols or slots for AGC, followed by one or more symbols or slots for PSCCH and PSSCH communication or PSSCH communication, and may end with one or more gap symbols or slots for Tx/Rx switching. Tx/Rx switching may include switching operation of a device from a transmission mode to a reception mode or switching operation of a device from a reception mode to a transmission mode (e.g., by activation and/or deactivation of one or more RF components of the device).

In some aspects, each slot of the multiple-slot unit structure occupies a same quantity of subchannels (e.g., the multiple contiguous slots of the multiple-slot unit structure occupy a same quantity of subchannels). However, for each slot, a transmission may or may not occupy the same subchannels. For example, to communicate in the multiple-slot unit(s), the first UE may transmit or receive a sidelink communication in one slot of a multiple-slot unit on one or more subchannels and in another slot of the multiple-slot unit on the one or more subchannels. As another example, to communicate in the multiple-slot unit(s), the first UE may transmit or receive a sidelink communication in one slot of a multiple-slot unit on one or more first subchannels and in another slot of the multiple-slot unit on one or more second subchannels that are different from the one or more first subchannels (e.g., the first subchannel(s) and the second subchannel(s) may differ by at least one subchannel).

In some aspects, a quantity of slots in the multiple-slot unit structure may be a function of (e.g., may depend on) a numerology used for sidelink communication. For example, for a higher numerology, a longer multiple-slot unit may improve the efficiency of communications. In some aspects, a quantity of slots in the multiple-slot unit structure may be a configurable parameter (e.g., configurable by RRC). This provides flexibility in trading off between overhead and latency (e.g., latency of HARQ feedback increases as the length of a multiple-slot unit increases).

The multiple-slot unit structure may include multiple time gap symbols for Tx/Rx switching for higher numerologies. In some aspects, a duration of the third time interval for Tx/Rx switching may be a function of (e.g., may depend on) a numerology used for sidelink communication. For example, the duration of the third time interval may be at least one symbol (e.g., at least one time gap symbol) for a numerology with a 120 kilohertz kHz SCS, at least four symbols (e.g., at least four time gap symbols) for a numerology with a 480 kHz SCS, or at least eight symbols (e.g., at least eight time gap symbols) for a numerology with a 960 kHz SCS.

The multiple-slot unit structure may include multiple symbols or one or more slots for AGC (e.g., for transmission and reception of an AGC signal). In some aspects, a duration of the first time interval for AGC may be a function of (e.g., may depend on) a numerology used for sidelink communication. For example, the duration of the first time interval may be at least four symbols for a numerology with a 120 kilohertz kHz SCS, at least one slot for a numerology with a 480 kHz SCS, or at least two slots for a numerology with a 960 kHz SCS.

In some aspects, the multiple-slot unit structure (e.g., with a PSFCH) may further include, in sequence following the third time interval for Tx/Rx switching, a fourth time interval for AGC, a fifth time interval for sidelink feedback (e.g., for PSFCH communication), and a sixth time interval providing another time gap for Tx/Rx switching. For example, each multiple-slot unit may end with one or more additional symbols or slots for AGC for a PSFCH, one or more symbols for PSFCH communication, and one or more gap symbols for Tx/Rx switching.

In some aspects, sidelink feedback in a multiple-slot unit may relate to one or more sidelink data communications from one or more preceding multiple-slot units. For example, the fifth time interval for sidelink feedback (e.g., at an end portion of the multiple-slot unit structure) may include one or more symbols for PSFCH communication, and the one or more symbols may carry multiple-bit ACK/NACK feedback relating to sidelink data slots (e.g., PSSCH slots), associated with the same transmitter, of one or more preceding multiple-slot units. As an example, a PSFCH based on PUCCH format 2, which occupies two symbols, may carry multiple ACKs or NACKs relating to PSSCH slots from preceding multiple-slot units. In some aspects, a duration of the fourth time interval for AGC (e.g., before a PSFCH) may be at least four symbols for a numerology with a 120 kilohertz kHz SCS, at least 14 symbols (i.e., one slot) for a numerology with a 480 kHz SCS, or at least 28 symbols (i.e., two slots) for a numerology with a 960 kHz SCS. In some aspects, a duration of the sixth time interval (e.g., after a PSFCH symbol burst) may be at least one gap symbol for a numerology with a 120 kilohertz kHz SCS, at least 4 gap symbols for a numerology with a 480 kHz SCS, or at least 8 gap symbols for a numerology with a 960 kHz SCS.

In some aspects, sidelink feedback in a multiple-slot unit may include a HARQ codebook indicating ACK/NACK feedback for one or more sidelink data communications (e.g., PSSCH communications) of a preceding multiple-slot unit. For example, ACK/NACK feedback for a PSSCH in a multiple-slot unit may form a HARQ codebook that is carried by a multiple-bit PSFCH in a subsequent multiple-slot unit. As an example, a receiver UE (e.g., the second UE) may prepare a HARQ codebook with ACK/NACK feedback relating to PSSCH slots of a particular multiple-slot unit, and the receiver UE may convey the ACK/NACK feedback (the HARQ codebook) to a transmitter UE (e.g., the first UE) via a multiple-bit PSFCH.

In some aspects, time intervals for sidelink feedback (e.g., the fifth time interval of the multiple-slot unit structure) may have a periodicity of one multiple-slot unit (e.g., in accordance with a configuration, as described herein). For example, a PSFCH instance may be present in every multiple-slot unit. Here, sidelink feedback in a multiple-slot unit may relate to a single preceding multiple-slot unit. In some aspects, time intervals for sidelink feedback may have a periodicity of more than one multiple-slot unit (e.g., in accordance with a configuration, as described herein). For example, a PSFCH instance may be present in every other multiple-slot unit, every three multiple-slot units, or the like. Here, sidelink feedback in a multiple-slot unit may relate to multiple preceding multiple-slot units.

In some cases, additional PSFCH resources in a multiple-slot unit may be used when time intervals for sidelink feedback have a periodicity of more than one multiple-slot unit, and when a transmitter UE (e.g., the first UE) of a PSSCH communication lacks multiple reception antenna panels to receive multiple PSFCH communications in a single time instance. In some aspects, the multiple-slot unit structure may include multiple time resources for sidelink feedback (e.g., in accordance with a configuration, as described herein) when a quantity of multiple-slot units of the periodicity is greater than one, and when a transmitter UE (e.g., the first UE) of a PSSCH communication exploits less than the quantity of reception antenna panels for sidelink feedback reception (e.g., for PSFCH reception). For example, a first quantity of multiple-slot units of the periodicity may be greater than a second quantity of reception antenna panels used by the first UE for sidelink feedback reception, and a multiple-slot unit may include multiple non-contiguous time intervals for sidelink feedback. As another example, a first quantity of multiple-slot units of the periodicity may be greater than or equal to a second quantity of reception antenna panels used by the first UE for sidelink feedback reception, the second quantity of reception antenna panels may be greater than one (e.g., multiple reception antenna panels are used), and a multiple-slot unit may include at least one sidelink feedback instance for reception of multiple communications of sidelink feedback using frequency division multiplexing.

Based at least in part on performing sidelink communication using a multiple-slot unit ending with a time gap for Tx/Rx switching, the UEs may conserve computing, power, network, and/or communication resources that may have otherwise been consumed by a per-slot time gap. For example, the multiple-slot unit increases the proportion of time resources used for sidelink control and data communication and decreases the proportion of time resource used as time gaps, thereby facilitating efficient use of network resources.

As indicated above, FIG. 4 is provided as an example. Other examples may differ from what is described with respect to FIG. 4.

Figure 5A:
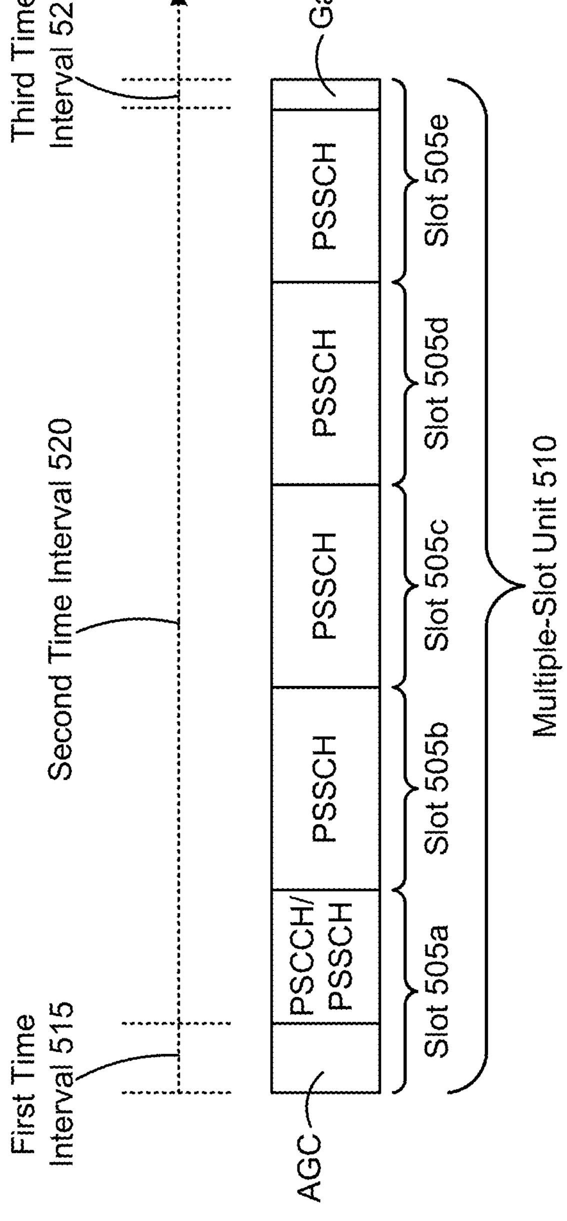
FIG. 5A is a diagram of an example multiple-slot unit structure, in accordance with the present disclosure.

FIG. 5A is a diagram of an example multiple-slot unit structure 500, in accordance with the present disclosure. The multiple-slot unit structure 500 may be used when a numerology with a 120 kHz SCS is used for sidelink communication. Moreover, the multiple-slot unit structure 500 may be used for sidelink communication without sidelink feedback (e.g., without a PSFCH). The multiple-slot unit structure 500 includes multiple contiguous slots 505 (shown as slots 505*a* to 505*e*) that form a multiple-slot unit 510, as described herein.

As shown, a first slot 505*a* of the multiple-slot unit structure 500 may include the first time interval 515 (e.g., of four symbols) for AGC and a portion of the second time interval 520 for sidelink control and/or data communication. For example, the first slot 505*a* of the multiple-slot unit structure 500 (at a beginning of the multiple-slot unit structure 500) may include, in sequence, four symbols for AGC and ten symbols for PSCCH and PSSCH communication. Moreover, a last slot 505*e* of the multiple-slot unit structure 500 may include a portion of the second time interval 520 and the third time interval 525 for Tx/Rx switching. For example, the last slot 505*e* (at an end of the multiple-slot unit structure 500) may include one symbol providing a time gap for Tx/Rx switching.

As indicated above, FIG. 5A is provided as an example. Other examples may differ from what is described with respect to FIG. 5A.

Figure 5B:
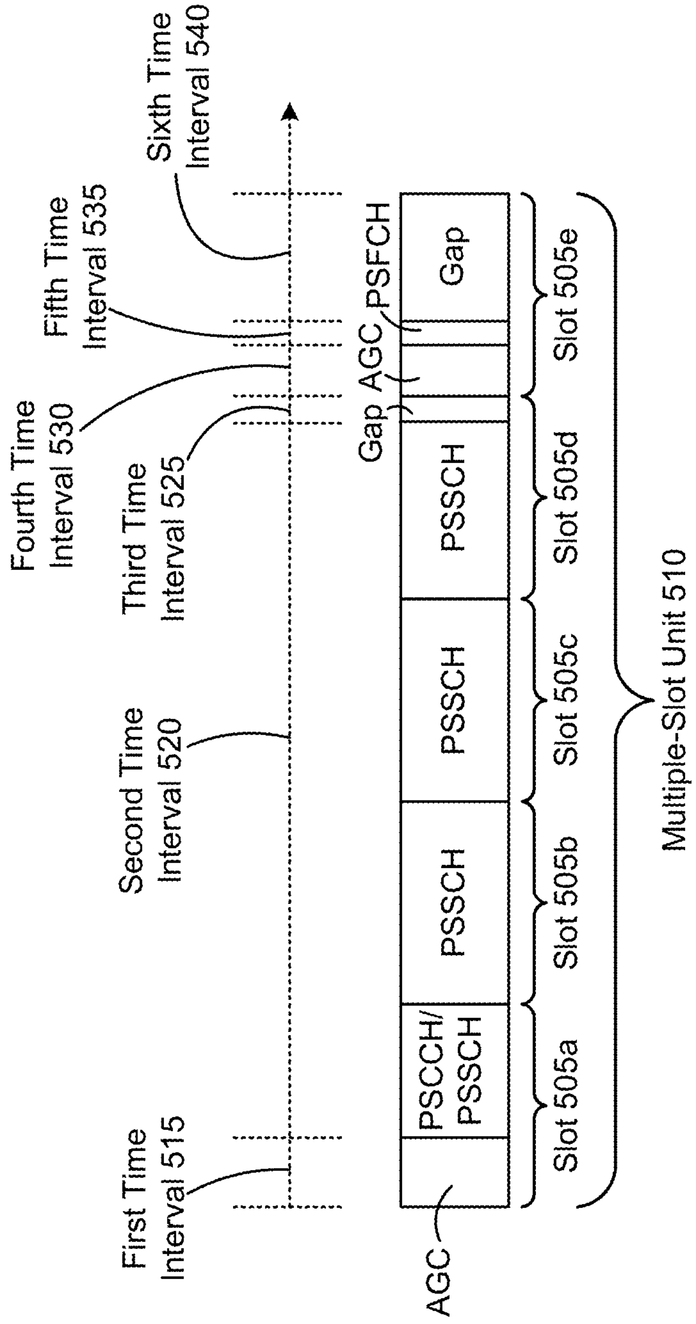
FIG. 5B is a diagram of an example multiple-slot unit structure, in accordance with the present disclosure.

FIG. 5B is a diagram of an example multiple-slot unit structure 550, in accordance with the present disclosure. The multiple-slot unit structure 550 may be used when a numerology with a 120 kHz SCS is used for sidelink communication. Moreover, the multiple-slot unit structure 550 may be used for sidelink communication with sidelink feedback (e.g., with a PSFCH). The multiple-slot unit structure 550 includes multiple contiguous slots 505 (shown as slots 505*a* to 505*e*) that form a multiple-slot unit 510, as described herein.

The multiple-slot unit structure 550 may include the first time interval 515, the second time interval 520, and the third time interval 525, in a similar manner as described in connection with FIG. 5A. As shown, a last slot 505*e* of the multiple-slot unit structure 550 may include the fourth time interval 530 for AGC, the fifth time interval 535 for sidelink feedback, and the sixth time interval 540 for Tx/Rx switching. For example, the last slot 505*e* of the multiple-slot unit structure 550 may include, in sequence, four symbols for AGC for PSFCH communication, one symbol for PSFCH communication, and nine symbols providing another time gap for Tx/Rx switching.

As indicated above, FIG. 5B is provided as an example. Other examples may differ from what is described with respect to FIG. 5B.

Figure 5C:
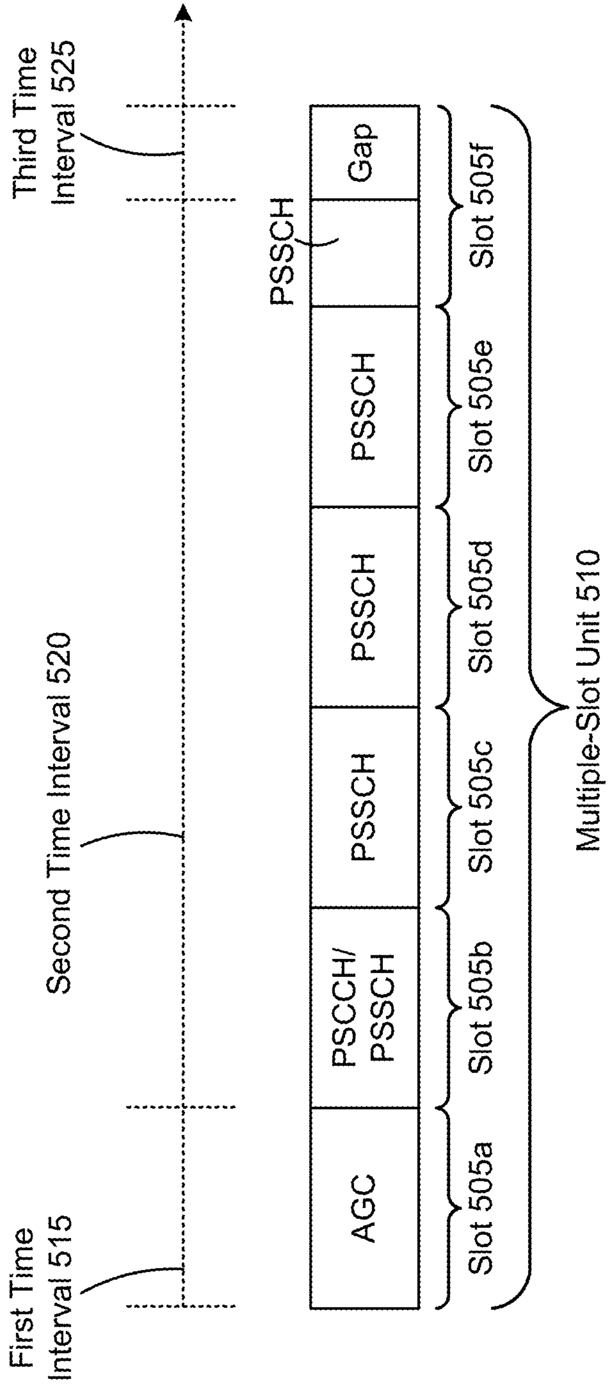
FIG. 5C is a diagram of an example multiple-slot unit structure, in accordance with the present disclosure.

FIG. 5C is a diagram of an example multiple-slot unit structure 555, in accordance with the present disclosure. The multiple-slot unit structure 555 may be used when a numerology with a 480 kHz SCS is used for sidelink communication. Moreover, the multiple-slot unit structure 555 may be used for sidelink communication without sidelink feedback (e.g., without a PSFCH). The multiple-slot unit structure 555 includes multiple contiguous slots 505 (shown as slots 505*a* to 505*f*) that form a multiple-slot unit 510, as described herein.

As shown, a first slot 505*a* of the multiple-slot unit structure 555 may include the first time interval 515 for AGC. For example, a beginning of the multiple-slot unit structure 555 may include one slot 505*a* for AGC followed by one or more slots 505*b* to 505*e* for sidelink control and/or data communication (e.g., PSCCH and/or PSSCH slots). Moreover, a last slot 505*f* of the multiple-slot unit structure 555 may include a portion of the second time interval 520 and the third time interval 525 for Tx/Rx switching. For example, the last slot 505*f* (at an end of the multiple-slot unit structure 555) may include, in sequence, ten symbols for PSSCH communication and four symbols providing a time gap for Tx/Rx switching.

As indicated above, FIG. 5C is provided as an example. Other examples may differ from what is described with respect to FIG. 5C.

Figure 5D:
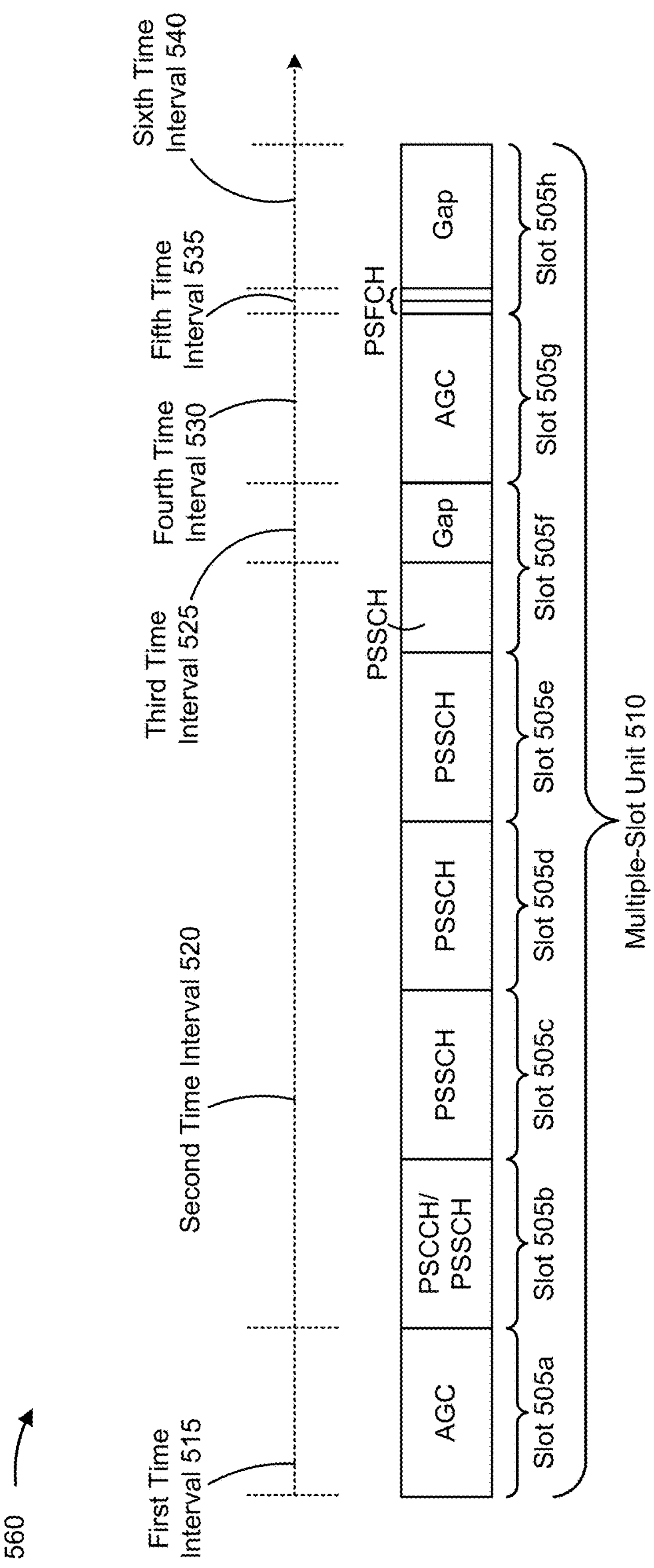
FIG. 5D is a diagram of an example multiple-slot unit structure, in accordance with the present disclosure.

FIG. 5D is a diagram of an example multiple-slot unit structure 560, in accordance with the present disclosure. The multiple-slot unit structure 560 may be used when a numerology with a 480 kHz SCS is used for sidelink communication. Moreover, the multiple-slot unit structure 560 may be used for sidelink communication with sidelink feedback (e.g., with a PSFCH). The multiple-slot unit structure 560 includes multiple contiguous slots 505 (shown as slots 505*a* to 505*h*) that form a multiple-slot unit 510, as described herein.

The multiple-slot unit structure 560 may include the first time interval 515, the second time interval 520, and the third time interval 525, in a similar manner as described in connection with FIG. 5C. As shown, a last slot 505*h* of the multiple-slot unit structure 560 may include the fifth time interval 535 for sidelink feedback and the sixth time interval 540 for Tx/Rx switching, and a slot 505*g* preceding the last slot 505*h* may include the fourth time interval 530 for AGC. For example, an end of the multiple-slot unit structure 560 may include one slot 505*g* for AGC for PSFCH communication followed by the last slot 505*h* that includes, in sequence, multiple bits for PSFCH communication and at least four symbols providing another time gap for Tx/Rx switching.

As indicated above, FIG. 5D is provided as an example. Other examples may differ from what is described with respect to FIG. 5D.

Figure 5E:
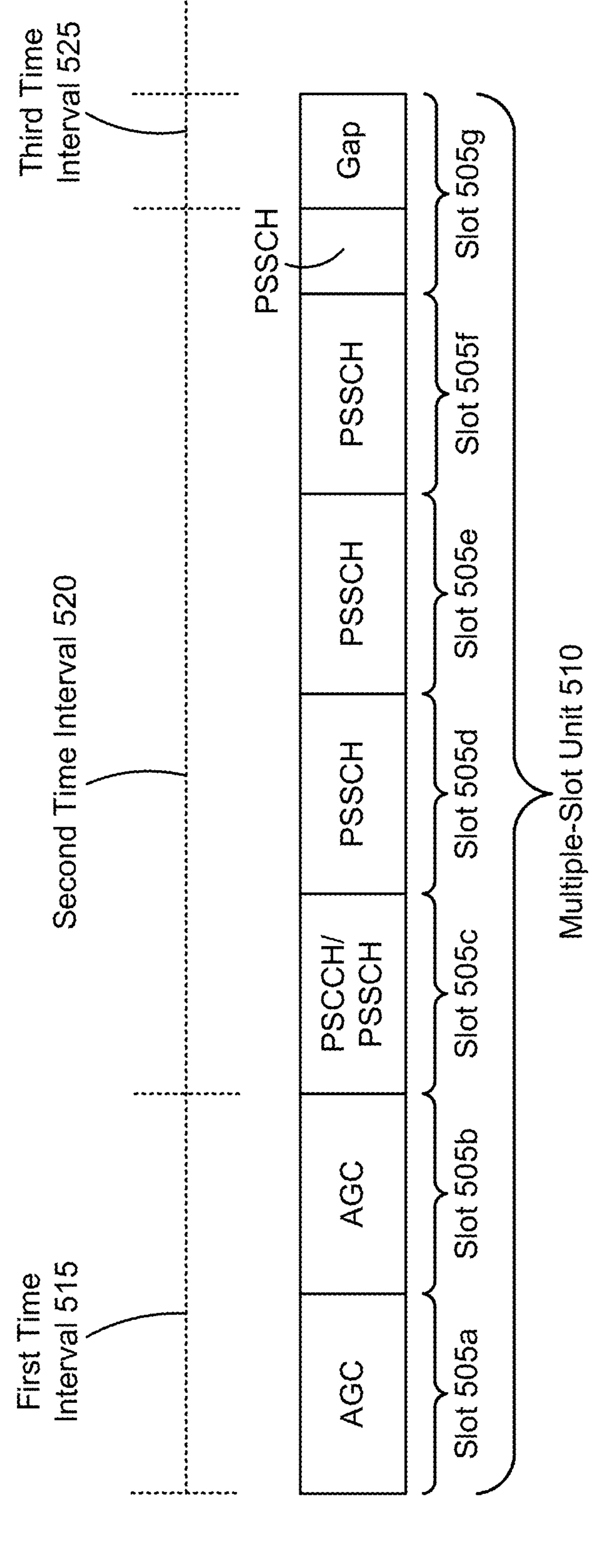
FIG. 5E is a diagram of an example multiple-slot unit structure, in accordance with the present disclosure.

FIG. 5E is a diagram of an example multiple-slot unit structure 565, in accordance with the present disclosure. The multiple-slot unit structure 565 may be used when a numerology with a 960 kHz SCS is used for sidelink communication. Moreover, the multiple-slot unit structure 565 may be used for sidelink communication without sidelink feedback (e.g., without a PSFCH). The multiple-slot unit structure 565 includes multiple contiguous slots 505 (shown as slots 505*a* to 505*g*) that form a multiple-slot unit 510, as described herein.

As shown, a first two slots 505*a*, 505*b* of the multiple-slot unit structure 565 may include the first time interval 515 for AGC. For example, a beginning of the multiple-slot unit structure 565 may include two slots 505*a*, 505*b* for AGC followed by one or more slots 505*c* to 505*f* for sidelink control and/or data communication (e.g., PSCCH and/or PSSCH slots). Moreover, a last slot 505*g* of the multiple-slot unit structure 565 may include a portion of the second time interval 520 and the third time interval 525 for Tx/Rx switching. For example, the last slot 505*g* (at an end of the multiple-slot unit structure 565) may include, in sequence, six symbols for PSSCH communication and eight symbols providing a time gap for Tx/Rx switching. In some aspects, more than eight symbols may be used for the time gap for Tx/Rx switching. Here, the third time interval 525 may be a last slot of the multiple-slot unit structure 565. For example, an end of the multiple-slot unit structure 565 may include a one slot time gap for Tx/Rx switching (e.g., when more than eight symbols are used for the time gap for Tx/Rx switching).

As indicated above, FIG. 5E is provided as an example. Other examples may differ from what is described with respect to FIG. 5E.

Figure 5F:
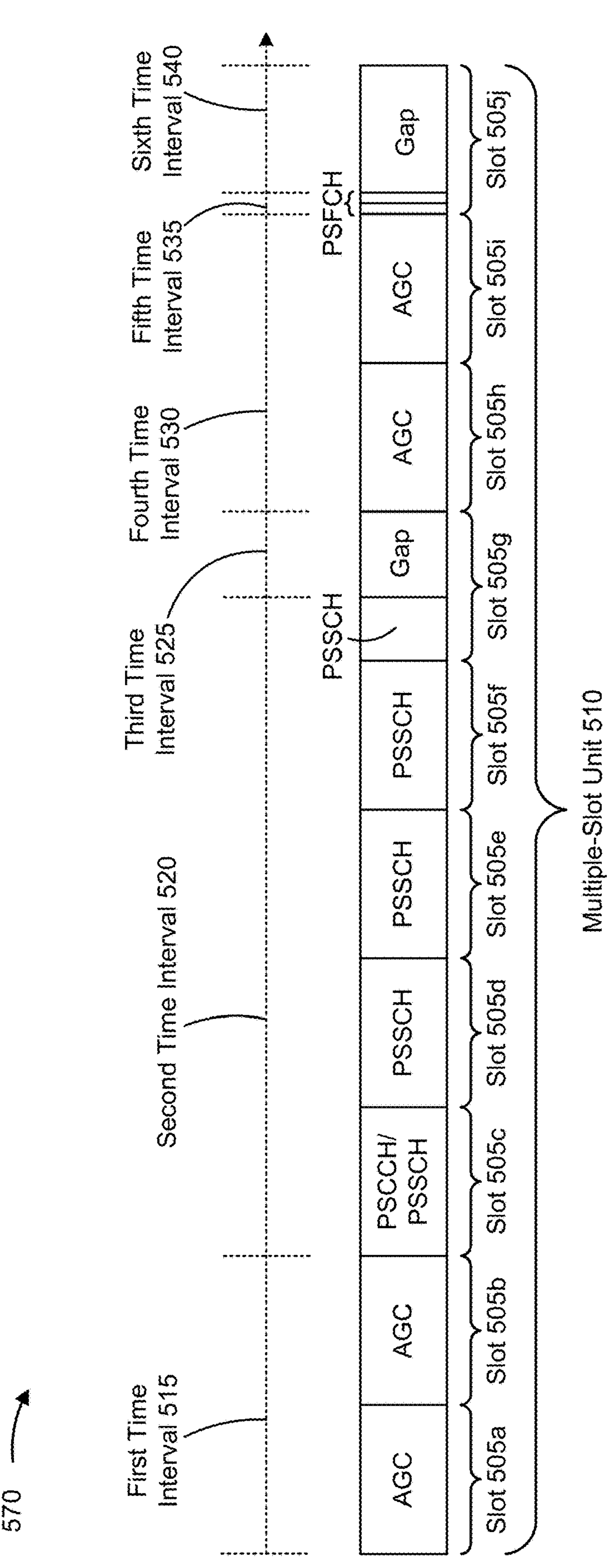
FIG. 5F is a diagram of an example multiple-slot unit structure, in accordance with the present disclosure.

FIG. 5F is a diagram of an example multiple-slot unit structure 570, in accordance with the present disclosure. The multiple-slot unit structure 570 may be used when a numerology with a 960 kHz SCS is used for sidelink communication. Moreover, the multiple-slot unit structure 570 may be used for sidelink communication with sidelink feedback (e.g., with a PSFCH). The multiple-slot unit structure 570 includes multiple contiguous slots 505 (shown as slots 505*a* to 505*j*) that form a multiple-slot unit 510, as described herein.

The multiple-slot unit structure 570 may include the first time interval 515, the second time interval 520, and the third time interval 525, in a similar manner as described in connection with FIG. 5E. As shown, a last slot 505*j* of the multiple-slot unit structure 570 may include the fifth time interval 535 for sidelink feedback and the sixth time interval 540 for Tx/Rx switching, and two slots 505*h*, 505*i* preceding the last slot 505*j* may include the fourth time interval 530 for AGC. For example, an end of the multiple-slot unit structure 570 may include two slots 505*h*, 505*i* for AGC for PSFCH communication followed by the last slot 505*j* that includes, in sequence, multiple bits for PSFCH communication and at least eight symbols providing another time gap for Tx/Rx switching.

As indicated above, FIG. 5F is provided as an example. Other examples may differ from what is described with respect to FIG. 5F.

Figure 6:
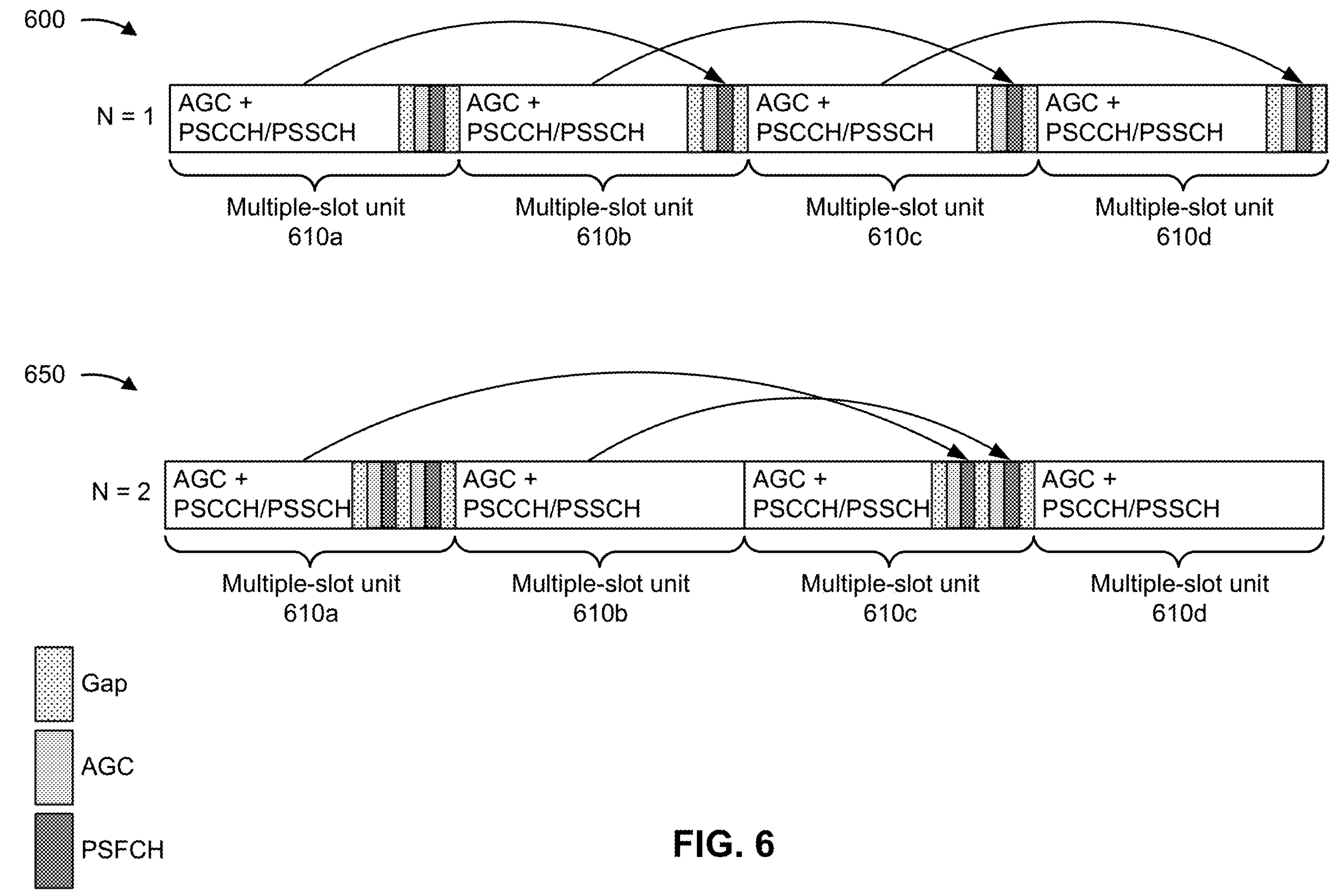
FIG. 6 is a diagram of examples of hybrid automatic repeat request (HARQ) procedures for sidelink communication using multiple-slot units, in accordance with the present disclosure.

FIG. 6 is a diagram of examples 600 and 650 of HARQ procedures for sidelink communication using a multiple-slot unit (shown as multiple-slot units 610*a* to 610*d*), in accordance with the present disclosure. In examples 600 and 650, a HARQ codebook may include ACK/NACK feedback for one or more PSSCH communications in a first multiple-slot unit 610, and the HARQ codebook may be carried in a multiple-bit PSFCH communication in a second multiple-slot unit 610 that is K multiple-slot units after the first multiple-slot unit 610 (e.g., K may be a configurable parameter). Moreover, PSFCH instances may be present in multiple-slot units 610 according to a periodicity N (e.g., N may be a configurable parameter), where N is a quantity of multiple-slot units 610 (e.g., PSFCH instances may be present in every N multiple-slot units 610).

In example 600, PSFCH instances may be present in every multiple-slot unit 610 (N=1). Thus, a PSFCH instance in a multiple-slot unit 610 may be associated with all sidelink data communications (e.g., all PSSCH slots) in a single multiple-slot unit that is K multiple-slot units prior. For example, if K=1, a PSFCH instance in multiple-slot unit 610*b* may carry ACK/NACK feedback for one or more sidelink data communications (e.g., PSSCH communications) in multiple-slot unit 610*a,* and so forth.

In example 650, PSFCH instances may be present in every other multiple-slot unit 610 (N=2). Thus, PSFCH instances in a multiple-slot unit 610 may be associated with all sidelink data communications (e.g., all PSSCH slots) in a plurality of multiple-slot units that are at least K multiple-slot units prior. For example, if K=1, respective PSFCH instances in multiple-slot unit 610*c* may carry ACK/NACK feedback for one or more sidelink data communications (e.g., PSSCH communications) in multiple-slot unit 610*b* and ACK/NACK feedback for one or more sidelink data communications in multiple-slot unit 610*a,* and so forth.

As indicated above, FIG. 6 is provided as an example. Other examples may differ from what is described with respect to FIG. 6.

Figure 7:
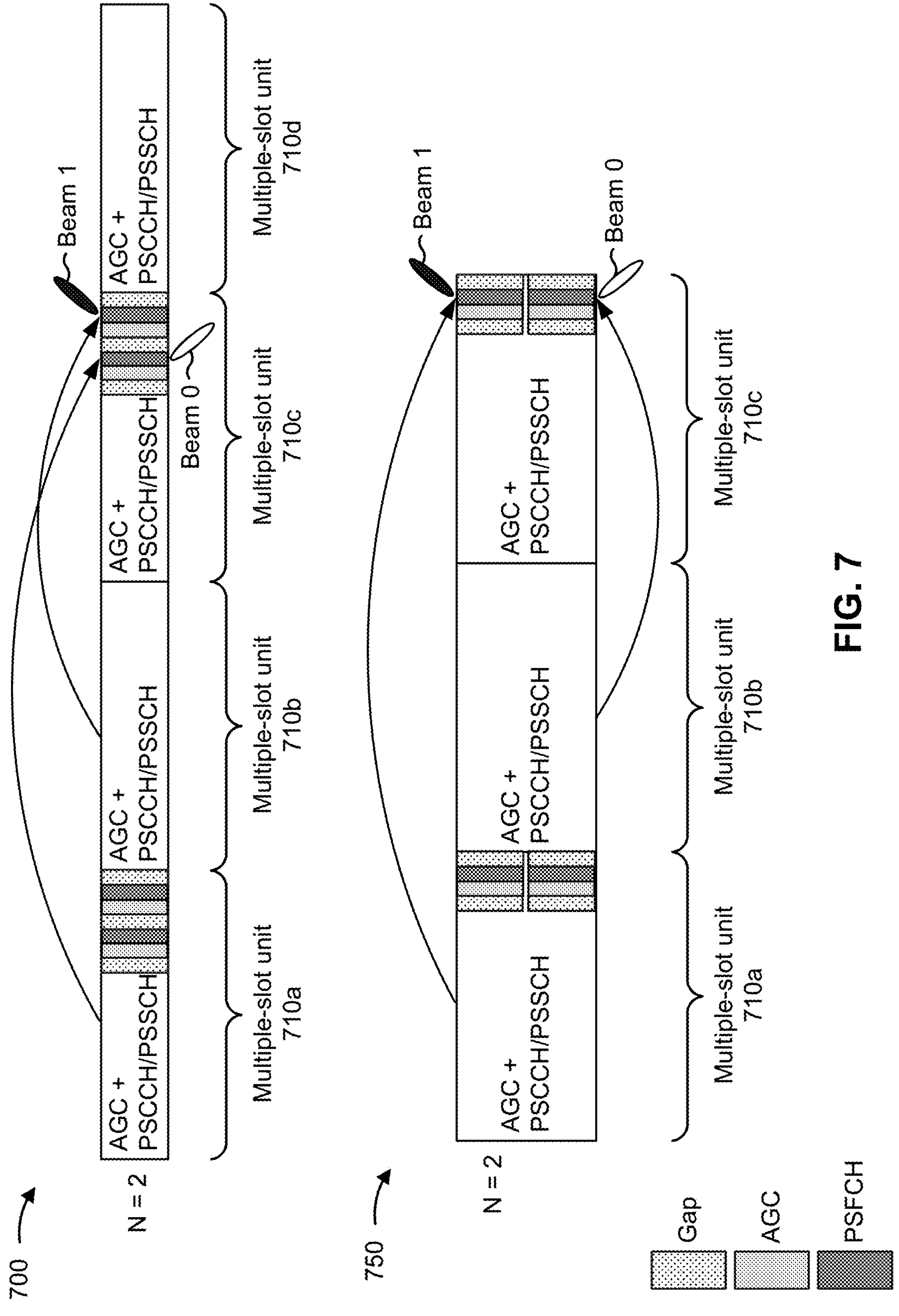
FIG. 7 is a diagram of examples of HARQ procedures for sidelink communication using multiple-slot units, in accordance with the present disclosure.

FIG. 7 is a diagram of examples 700 and 750 of HARQ procedures for sidelink communication using a multiple-slot unit (shown as multiple-slot units 710*a* to 710*d*), in accordance with the present disclosure. In examples 700 and 750, the periodicity N may be more than one multiple-slot unit 710. In some aspects, a transmitter UE may transmit PSSCH communications in N multiple-slot units 710 to N different receiver UEs. Accordingly, to receive PSFCH communications from the N receiver UEs, the transmitter UE may use N reception beams.

In example 700, the transmitter UE may exploit less than N reception antenna panels for PSFCH reception. For example, as shown, if N=2, and if the transmitter UE exploits one reception antenna panel for PSFCH reception, then a multiple-slot unit 710*c* may include multiple non-contiguous PSFCH instances. Continuing with the example, the transmitter UE, using one reception antenna panel, may receive sidelink feedback in a first PSFCH instance using a first reception beam (Beam 0) and in a second PSFCH instance using a second reception beam (Beam 1). As an example, if the transmitter UE uses only one reception antenna panel, then up to N time-resource segments including a time interval for AGC (e.g., the fourth time interval), a time interval for PSFCH communication (e.g., the fifth time interval), and a time interval providing a time gap for Tx/Rx switching (e.g., the sixth time interval) may be included in a multiple-slot unit 710. Continuing with the example, each of the N time-resource segments may be associated with a respective multiple-slot unit 710.

In example 750, the transmitter UE may exploit N or less than N reception antenna panels for PSFCH reception. For example, as shown, if N=2, and if the transmitter UE exploits two reception antenna panels for PSFCH reception, then a multiple-slot unit 710*c* may include a single PSFCH instance. Continuing with the example, the transmitter UE, using a first reception antenna panel, may receive first sidelink feedback in the PSFCH instance using a first reception beam (Beam 0) and, using a second reception antenna panel, may receive second sidelink feedback in the PSFCH instance using a second reception beam (Beam 1), where the PSFCH for the first sidelink feedback and the PSFCH for the second sidelink feedback may be frequency division multiplexed. As an example, if the transmitter UE uses two reception antenna panels, then N÷2 (e.g., that may be rounded-up to an integer) time-resource segments including a time interval for AGC (e.g., the fourth time interval), a time interval for PSFCH communication (e.g., the fifth time interval), and a time interval providing a time gap for Tx/Rx switching (e.g., the sixth time interval) may be included in a multiple-slot unit 710. Continuing with the example, the transmitter UE may receive sidelink feedback in two frequency division multiplexed PSFCHs, using the two reception antenna panels, in a time-resource segment.

As indicated above, FIG. 7 is provided as an example. Other examples may differ from what is described with respect to FIG. 7.

Figure 8:
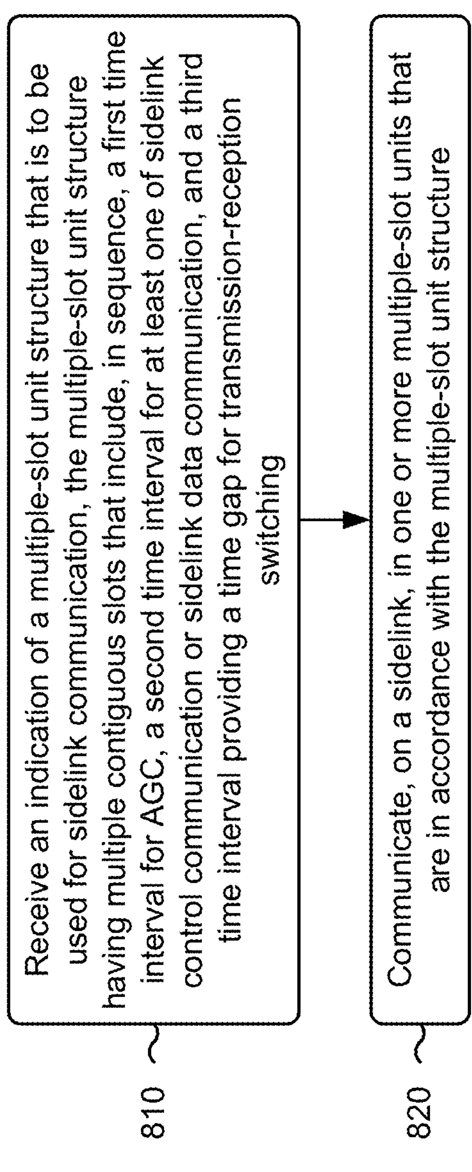
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with sidelink communication using a multiple-slot unit.

As shown in FIG. 8, in some aspects, process 800 may include receiving an indication of a multiple-slot unit structure that is to be used for sidelink communication, the multiple-slot unit structure having multiple contiguous slots that include, in sequence, a first time interval for AGC, a second time interval for at least one of sidelink control communication or sidelink data communication, and a third time interval providing a time gap for transmission-reception switching (block 810). For example, the UE (e.g., using reception component 902 and/or communication manager 906, depicted in FIG. 9) may receive an indication of a multiple-slot unit structure that is to be used for sidelink communication, as described above. In some aspects, the multiple-slot unit structure may have multiple contiguous slots that include, in sequence, a first time interval for AGC, a second time interval for at least one of sidelink control communication or sidelink data communication, and a third time interval providing a time gap for transmission-reception switching.

As further shown in FIG. 8, in some aspects, process 800 may include communicating, on a sidelink, in one or more multiple-slot units that are in accordance with the multiple-slot unit structure (block 820). For example, the UE (e.g., using reception component 902, transmission component 904, and/or communication manager 906, depicted in FIG. 9) may communicate, on a sidelink, in one or more multiple-slot units that are in accordance with the multiple-slot unit structure, as described above.

Process 800 may include additional aspects, such as any single aspect or any combination of aspects described below and/or in connection with one or more other processes described elsewhere herein.

In a first aspect, the indication is in configuration information indicating a numerology to be used for sidelink communication, and the multiple-slot unit structure is associated with the numerology.

In a second aspect, alone or in combination with the first aspect, the indication is in configuration information indicating the multiple-slot unit structure.

In a third aspect, alone or in combination with one or more of the first and second aspects, the multiple-slot unit structure is for a numerology with a 120 kHz SCS, a 480 kHz SCS, or a 960 kHz SCS.

In a fourth aspect, alone or in combination with one or more of the first through third aspects, each slot of the multiple-slot unit structure occupies a same quantity of subchannels.

In a fifth aspect, alone or in combination with one or more of the first through fourth aspects, communicating in the one or more multiple-slot units includes transmitting or receiving a sidelink communication in one slot of a multiple-slot unit, of the one or more multiple-slot units, on one or more subchannels and in another slot of the multiple-slot unit on the one or more subchannels.

In a sixth aspect, alone or in combination with one or more of the first through fifth aspects, communicating in the one or more multiple-slot units includes transmitting or receiving a sidelink communication in one slot of a multiple-slot unit, of the one or more multiple-slot units, on one or more first subchannels and in another slot of the multiple-slot unit on one or more second subchannels that are different from the one or more first subchannels.

In a seventh aspect, alone or in combination with one or more of the first through sixth aspects, a quantity of slots in the multiple-slot unit structure is a function of a numerology used for sidelink communication.

In an eighth aspect, alone or in combination with one or more of the first through seventh aspects, a quantity of slots in the multiple-slot unit structure is a configurable parameter.

In a ninth aspect, alone or in combination with one or more of the first through eighth aspects, a duration of the third time interval is a function of a numerology used for sidelink communication.

In a tenth aspect, alone or in combination with one or more of the first through ninth aspects, a duration of the third time interval is at least one symbol for a first numerology with a 120 kHz SCS, at least four symbols for a second numerology with a 480 kHz SCS, or at least eight symbols for a third numerology with a 960 kHz SCS.

In an eleventh aspect, alone or in combination with one or more of the first through tenth aspects, a last slot of the multiple-slot unit structure includes a portion of the second time interval and the third time interval.

In a twelfth aspect, alone or in combination with one or more of the first through tenth aspects, the third time interval is a last slot of the multiple-slot unit structure.

In a thirteenth aspect, alone or in combination with one or more of the first through twelfth aspects, a duration of the first time interval is a function of a numerology used for sidelink communication.

In a fourteenth aspect, alone or in combination with one or more of the first through thirteenth aspects, a first slot of the multiple-slot unit structure includes the first time interval and a portion of the second time interval.

In a fifteenth aspect, alone or in combination with one or more of the first through thirteenth aspects, at least a first slot of the multiple-slot unit structure includes the first time interval.

In a sixteenth aspect, alone or in combination with one or more of the first through fifteenth aspects, the multiple-slot unit structure includes, in sequence following the third time interval, a fourth time interval for automatic gain control, a fifth time interval for sidelink feedback, and a sixth time interval providing another time gap for transmission-reception switching.

In a seventeenth aspect, alone or in combination with one or more of the first through sixteenth aspects, a last slot of the multiple-slot unit structure includes the fourth time interval, the fifth time interval, and the sixth time interval.

In an eighteenth aspect, alone or in combination with one or more of the first through sixteenth aspects, a last slot of the multiple-slot unit structure includes the fifth time interval and the sixth time interval, and one or more slots preceding the last slot include the fourth time interval.

In a nineteenth aspect, alone or in combination with one or more of the first through eighteenth aspects, sidelink feedback in a multiple-slot unit, of the one or more multiple-slot units, relates to one or more sidelink data communications from one or more preceding multiple-slot units.

In a twentieth aspect, alone or in combination with one or more of the first through nineteenth aspects, sidelink feedback in a multiple-slot unit, of the one or more multiple-slot units, includes a HARQ codebook indicating acknowledgement feedback or negative acknowledgement feedback for one or more sidelink data communications of a preceding multiple-slot unit.

In a twenty-first aspect, alone or in combination with one or more of the first through twentieth aspects, time intervals for sidelink feedback have a periodicity of one multiple-slot unit, and sidelink feedback in a multiple-slot unit, of the one or more multiple-slot units, relates to a single preceding multiple-slot unit.

In a twenty-second aspect, alone or in combination with one or more of the first through twentieth aspects, time intervals for sidelink feedback have a periodicity of more than one multiple-slot unit, and sidelink feedback in a multiple-slot unit, of the one or more multiple-slot units, relates to multiple preceding multiple-slot units.

In a twenty-third aspect, alone or in combination with one or more of the first through twenty-second aspects, a first quantity of multiple-slot units of the periodicity is greater than a second quantity of reception antenna panels used by the UE for sidelink feedback reception, and the multiple-slot unit includes multiple non-contiguous time intervals for sidelink feedback.

In a twenty-fourth aspect, alone or in combination with one or more of the first through twenty-third aspects, a first quantity of multiple-slot units of the periodicity is greater than or equal to a second quantity of reception antenna panels used by the UE for sidelink feedback reception, the second quantity of reception antenna panels is greater than one, and the multiple-slot unit includes at least one sidelink feedback instance for reception of multiple communications of sidelink feedback using frequency division multiplexing.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
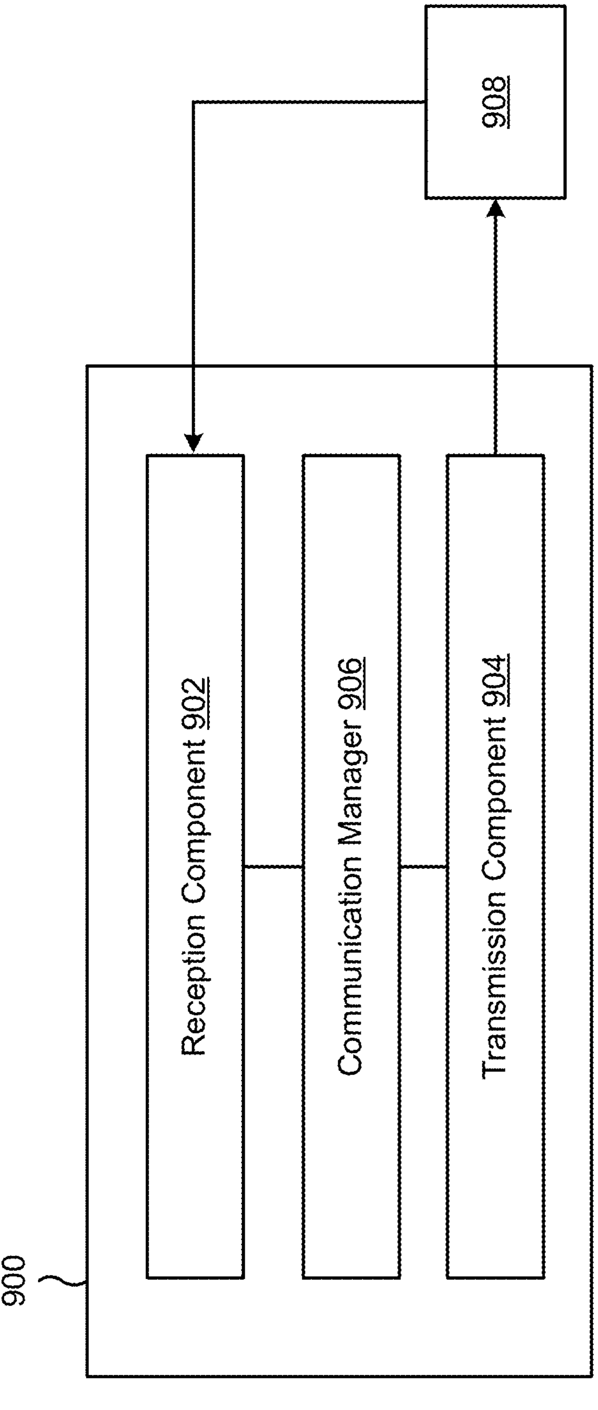
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 140 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIGS. 4-7. Additionally, or alternatively, the apparatus 900 may be configured to perform one or more processes described herein, such as process 800 of FIG. 8, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The reception component 902 may receive an indication of a multiple-slot unit structure that is to be used for sidelink communication. In some aspects, the multiple-slot unit structure may have multiple contiguous slots that include, in sequence, a first time interval for AGC, a second time interval for at least one of sidelink control communication or sidelink data communication, and a third time interval providing a time gap for transmission-reception switching. In some aspects, the transmission component 904 may transmit an indication of a multiple-slot unit structure that is to be used for sidelink communication. The reception component 902 and/or the transmission component 904 may communicate, on a sidelink, in one or more multiple-slot units that are in accordance with the multiple-slot unit structure.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
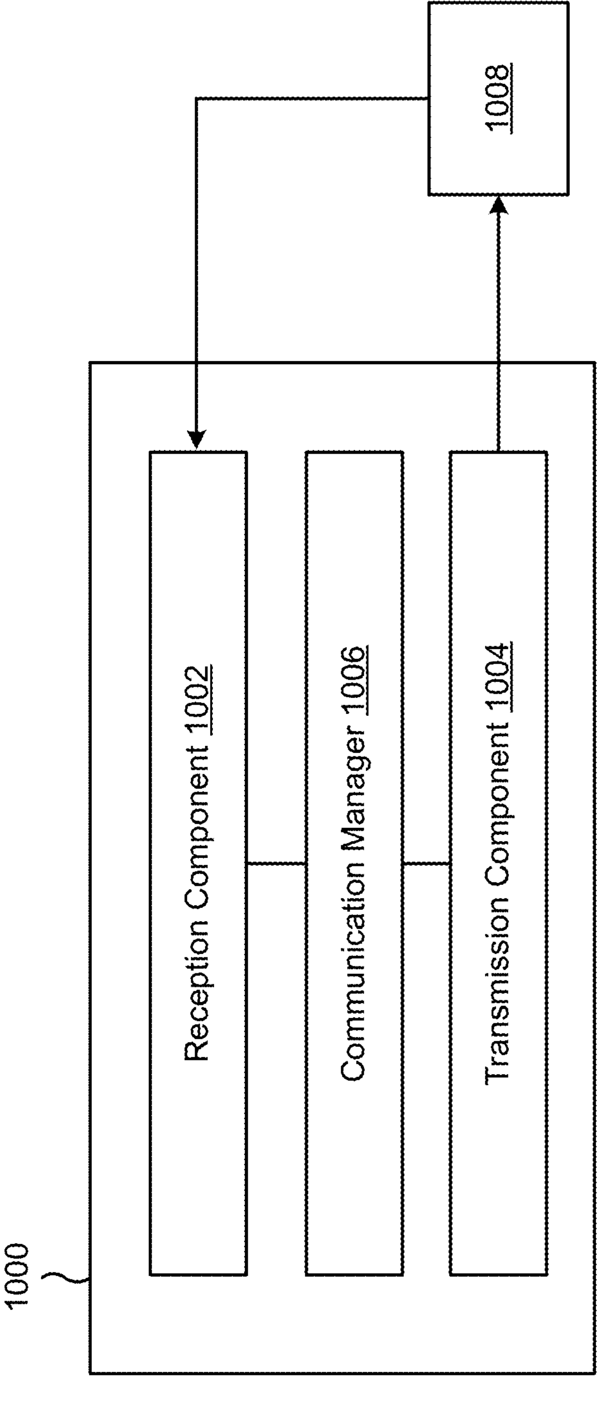
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 150 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 4-7. Additionally, or alternatively, the apparatus 1000 may be configured to perform one or more other processes described herein, or a combination thereof. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2. In some aspects, the reception component 1002 and/or the transmission component 1004 may 1004 may include or may be included in a network interface. The network interface may be configured to obtain and/or output signals for the apparatus 1000 via one or more communications links, such as a backhaul link, a midhaul link, and/or a fronthaul link.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The transmission component 1004 may receive an indication of a multiple-slot unit structure that is to be used for sidelink communication. In some aspects, the multiple-slot unit structure may have multiple contiguous slots that include, in sequence, a first time interval for AGC, a second time interval for at least one of sidelink control communication or sidelink data communication, and a third time interval providing a time gap for transmission-reception switching.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving an indication of a multiple-slot unit structure that is to be used for sidelink communication, the multiple-slot unit structure having multiple contiguous slots that include, in sequence, a first time interval for automatic gain control, a second time interval for at least one of sidelink control communication or sidelink data communication, and a third time interval providing a time gap for transmission-reception switching; and communicating, on a sidelink, in one or more multiple-slot units that are in accordance with the multiple-slot unit structure.

Aspect 2: The method of Aspect 1, wherein the indication is in configuration information indicating a numerology to be used for sidelink communication, and the multiple-slot unit structure is associated with the numerology.

Aspect 3: The method of any of Aspects 1-2, wherein the indication is in configuration information indicating the multiple-slot unit structure.

Aspect 4: The method of any of Aspects 1-3, wherein the multiple-slot unit structure is for a numerology with a 120 kilohertz (kHz) subcarrier spacing (SCS), a 480 kHz SCS, or a 960 kHz SCS.

Aspect 5: The method of any of Aspects 1-4, wherein each slot of the multiple-slot unit structure occupies a same quantity of subchannels.

Aspect 6: The method of any of Aspects 1-5, wherein communicating in the one or more multiple-slot units comprises: transmitting or receiving a sidelink communication in one slot of a multiple-slot unit, of the one or more multiple-slot units, on one or more subchannels and in another slot of the multiple-slot unit on the one or more subchannels.

Aspect 7: The method of any of Aspects 1-6, wherein communicating in the one or more multiple-slot units comprises: transmitting or receiving a sidelink communication in one slot of a multiple-slot unit, of the one or more multiple-slot units, on one or more first subchannels and in another slot of the multiple-slot unit on one or more second subchannels that are different from the one or more first subchannels.

Aspect 8: The method of any of Aspects 1-7, wherein a quantity of slots in the multiple-slot unit structure is a function of a numerology used for sidelink communication.

Aspect 9: The method of any of Aspects 1-8, wherein a quantity of slots in the multiple-slot unit structure is a configurable parameter.

Aspect 10: The method of any of Aspects 1-9, wherein a duration of the third time interval is a function of a numerology used for sidelink communication.

Aspect 11: The method of any of Aspects 1-10, wherein a duration of the third time interval is at least one symbol for a first numerology with a 120 kilohertz (kHz) subcarrier spacing (SCS), at least four symbols for a second numerology with a 480 kHz SCS, or at least eight symbols for a third numerology with a 960 kHz SCS.

Aspect 12: The method of any of Aspects 1-11, wherein a last slot of the multiple-slot unit structure includes a portion of the second time interval and the third time interval.

Aspect 13: The method of any of Aspects 1-11, wherein the third time interval is a last slot of the multiple-slot unit structure.

Aspect 14: The method of any of Aspects 1-13, wherein a duration of the first time interval is a function of a numerology used for sidelink communication.

Aspect 15: The method of any of Aspects 1-14, wherein a first slot of the multiple-slot unit structure includes the first time interval and a portion of the second time interval.

Aspect 16: The method of any of Aspects 1-14, wherein at least a first slot of the multiple-slot unit structure includes the first time interval.

Aspect 17: The method of any of Aspects 1-16, wherein the multiple-slot unit structure includes, in sequence following the third time interval, a fourth time interval for automatic gain control, a fifth time interval for sidelink feedback, and a sixth time interval providing another time gap for transmission-reception switching.

Aspect 18: The method of Aspect 17, wherein a last slot of the multiple-slot unit structure includes the fourth time interval, the fifth time interval, and the sixth time interval.

Aspect 19: The method of Aspect 17, wherein a last slot of the multiple-slot unit structure includes the fifth time interval and the sixth time interval, and one or more slots preceding the last slot include the fourth time interval.

Aspect 20: The method of any of Aspects 1-19, wherein sidelink feedback in a multiple-slot unit, of the one or more multiple-slot units, relates to one or more sidelink data communications from one or more preceding multiple-slot units.

Aspect 21: The method of any of Aspects 1-20, wherein sidelink feedback in a multiple-slot unit, of the one or more multiple-slot units, includes a hybrid automatic repeat request (HARQ) codebook indicating acknowledgement feedback or negative acknowledgement feedback for one or more sidelink data communications of a preceding multiple-slot unit.

Aspect 22: The method of any of Aspects 1-21, wherein time intervals for sidelink feedback have a periodicity of one multiple-slot unit, and wherein sidelink feedback in a multiple-slot unit, of the one or more multiple-slot units, relates to a single preceding multiple-slot unit.

Aspect 23: The method of any of Aspects 1-21, wherein time intervals for sidelink feedback have a periodicity of more than one multiple-slot unit, and wherein sidelink feedback in a multiple-slot unit, of the one or more multiple-slot units, relates to multiple preceding multiple-slot units.

Aspect 24: The method of Aspect 23, wherein a first quantity of multiple-slot units of the periodicity is greater than a second quantity of reception antenna panels used by the UE for sidelink feedback reception, and wherein the multiple-slot unit includes multiple non-contiguous time intervals for sidelink feedback.

Aspect 25: The method of any of Aspects 23-24, wherein a first quantity of multiple-slot units of the periodicity is greater than or equal to a second quantity of reception antenna panels used by the UE for sidelink feedback reception, wherein the second quantity of reception antenna panels is greater than one, and wherein the multiple-slot unit includes at least one sidelink feedback instance for reception of multiple communications of sidelink feedback using frequency division multiplexing.

Aspect 26: An apparatus for wireless communication at a device, comprising a processor; memory coupled with the processor; and instructions stored in the memory and executable by the processor to cause the apparatus to perform the method of one or more of Aspects 1-25.

Aspect 27: A device for wireless communication, comprising a memory and one or more processors coupled to the memory, the one or more processors configured to perform the method of one or more of Aspects 1-25.

Aspect 28: An apparatus for wireless communication, comprising at least one means for performing the method of one or more of Aspects 1-25.

Aspect 29: A non-transitory computer-readable medium storing code for wireless communication, the code comprising instructions executable by a processor to perform the method of one or more of Aspects 1-25.

Aspect 30: A non-transitory computer-readable medium storing a set of instructions for wireless communication, the set of instructions comprising one or more instructions that, when executed by one or more processors of a device, cause the device to perform the method of one or more of Aspects 1-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term “component” is intended to be broadly construed as hardware and/or a combination of hardware and software. “Software” shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a “processor” is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, “satisfying a threshold” may depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to “at least one of” a list of items refers to any combination of those items, including single members. As an example, “at least one of: a, b, or c” is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles “a” and “an” are intended to include one or more items and may be used interchangeably with “one or more.” Further, as used herein, the article “the” is intended to include one or more items referenced in connection with the article “the” and may be used interchangeably with “the one or more.” Furthermore, as used herein, the terms “set” and “group” are intended to include one or more items and may be used interchangeably with “one or more.” Where only one item is intended, the phrase “only one” or similar language is used. Also, as used herein, the terms “has,” “have,” “having,” or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:

one or more memories; and one or more processors, coupled to the one or more memories, configured to:

receive an indication of a multiple-slot unit structure that is to be used for sidelink communication, the multiple-slot unit structure having multiple contiguous slots that include, in sequence, a first time interval for automatic gain control, a second time interval for at least one of sidelink control communication or sidelink data communication, and a third time interval providing a time gap for transmission-reception switching; and communicate, on a sidelink, in one or more multiple-slot units that are in accordance with the multiple-slot unit structure, wherein a quantity of slots in the multiple-slot unit structure is a function of a numerology used for sidelink communication or a configurable parameter.

2. The apparatus of claim 1, wherein the indication is in configuration information indicating a numerology to be used for sidelink communication, and the multiple-slot unit structure is associated with the numerology.

3. The apparatus of claim 1, wherein the indication is in configuration information indicating the multiple-slot unit structure.

4. The apparatus of claim 1, wherein the multiple-slot unit structure is for a numerology with a 120 kilohertz (kHz) subcarrier spacing (SCS), a 480 kHz SCS, or a 960 kHz SCS.

5. The apparatus of claim 1, wherein each slot of the multiple-slot unit structure occupies a same quantity of subchannels.

6. The apparatus of claim 1, wherein the one or more processors, to communicate in the one or more multiple-slot units, are configured to:

transmit or receive a sidelink communication in one slot of a multiple-slot unit, of the one or more multiple-slot units, on one or more subchannels and in another slot of the multiple-slot unit on the one or more subchannels.

7. The apparatus of claim 1, wherein the one or more processors, to communicate in the one or more multiple-slot units, are configured to:

transmit or receive a sidelink communication in one slot of a multiple-slot unit, of the one or more multiple-slot units, on one or more first subchannels and in another slot of the multiple-slot unit on one or more second subchannels that are different from the one or more first subchannels.

8. The apparatus of claim 1, wherein a duration of at least one of the first time interval or the third time interval is a function of a numerology used for sidelink communication.

9. The apparatus of claim 1, wherein a duration of the third time interval is at least one symbol for a first numerology with a 120 kilohertz (kHz) subcarrier spacing (SCS), at least four symbols for a second numerology with a 480 kHz SCS, or at least eight symbols for a third numerology with a 960 kHz SCS.

10. The apparatus of claim 1, wherein the multiple-slot unit structure includes, in sequence following the third time interval, a fourth time interval for automatic gain control, a fifth time interval for sidelink feedback, and a sixth time interval providing another time gap for transmission-reception switching.

11. The apparatus of claim 1, wherein sidelink feedback in a multiple-slot unit, of the one or more multiple-slot units, relates to one or more sidelink data communications from one or more preceding multiple-slot units.

12. The apparatus of claim 1, wherein sidelink feedback in a multiple-slot unit, of the one or more multiple-slot units, includes a hybrid automatic repeat request (HARQ) codebook indicating acknowledgement feedback or negative acknowledgement feedback for one or more sidelink data communications of a preceding multiple-slot unit.

13. The apparatus of claim 1, wherein time intervals for sidelink feedback have a periodicity of one multiple-slot unit, and wherein sidelink feedback in a multiple-slot unit, of the one or more multiple-slot units, relates to a single preceding multiple-slot unit.

14. The apparatus of claim 1, wherein time intervals for sidelink feedback have a periodicity of more than one multiple-slot unit, and wherein sidelink feedback in a multiple-slot unit, of the one or more multiple-slot units, relates to multiple preceding multiple-slot units.

15. The apparatus of claim 14, wherein a first quantity of multiple-slot units of the periodicity is greater than a second quantity of reception antenna panels used by the UE for sidelink feedback reception, and wherein the multiple-slot unit includes multiple non-contiguous time intervals for sidelink feedback.

16. The apparatus of claim 14, wherein a first quantity of multiple-slot units of the periodicity is greater than or equal to a second quantity of reception antenna panels used by the UE for sidelink feedback reception, wherein the second quantity of reception antenna panels is greater than one, and wherein the multiple-slot unit includes at least one sidelink feedback instance for reception of multiple communications of sidelink feedback using frequency division multiplexing.

17. A method of wireless communication performed at an apparatus of a user equipment (UE), comprising:

receiving an indication of a multiple-slot unit structure that is to be used for sidelink communication, the multiple-slot unit structure having multiple contiguous slots that include, in sequence, a first time interval for automatic gain control, a second time interval for at least one of sidelink control communication or sidelink data communication, and a third time interval providing a time gap for transmission-reception switching; and communicating, on a sidelink, in one or more multiple-slot units that are in accordance with the multiple-slot unit structure, wherein a quantity of slots in the multiple-slot unit structure is a function of a numerology used for sidelink communication or a configurable parameter.

18. The method of claim 17, wherein the indication is in configuration information indicating the multiple-slot unit structure, or indicating a numerology to be used for sidelink communication and the multiple-slot unit structure is associated with the numerology.

19. The method of claim 17, wherein each slot of the multiple-slot unit structure occupies a same quantity of subchannels.

20. The method of claim 17, wherein communicating in the one or more multiple-slot units comprises:

transmitting or receiving a sidelink communication in one slot of a multiple-slot unit, of the one or more multiple-slot units, on one or more subchannels and in another slot of the multiple-slot unit on the one or more subchannels.

21. The method of claim 17, wherein communicating in the one or more multiple-slot units comprises:

transmitting or receiving a sidelink communication in one slot of a multiple-slot unit, of the one or more multiple-slot units, on one or more first subchannels and in another slot of the multiple-slot unit on one or more second subchannels that are different from the one or more first subchannels.

22. The method of claim 17, wherein a duration of at least one of the first time interval or the third time interval is a function of a numerology used for sidelink communication.

23. The method of claim 17, wherein the multiple-slot unit structure includes, in sequence following the third time interval, a fourth time interval for automatic gain control, a fifth time interval for sidelink feedback, and a sixth time interval providing another time gap for transmission-reception switching.

24. A non-transitory computer-readable medium storing a set of instructions for wireless communication, the set of instructions comprising:

one or more instructions that, when executed by one or more processors of a user equipment (UE), cause the UE to:

receive an indication of a multiple-slot unit structure that is to be used for sidelink communication, the multiple-slot unit structure having multiple contiguous slots that include, in sequence, a first time interval for automatic gain control, a second time interval for at least one of sidelink control communication or sidelink data communication, and a third time interval providing a time gap for transmission-reception switching; and communicate, on a sidelink, in one or more multiple-slot units that are in accordance with the multiple-slot unit structure wherein a quantity of slots in the multiple-slot unit structure is a function of a numerology used for sidelink communication or a configurable parameter.

25. The non-transitory computer-readable medium of claim 24, wherein each slot of the multiple-slot unit structure occupies a same quantity of subchannels.

* * * * *